US 6,744,632 B2
Jun. 1, 2004

(12) United States Patent
Wilson et al.

(54) COMPOSITE CONSTRUCTION BAFFLE FOR MODULAR ELECTRONIC SYSTEMS

(75) Inventors: Jeremy I. Wilson, Roseville, CA (US); Todd D. Robertus, Roseville, CA (US); Steven R. Hahn, El Dorado Hills, CA (US); Michael A. Brooks, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/251,525

(22) Filed: Sep. 20, 2002

(65) Prior Publication Data
US 2004/0057210 A1 Mar. 25, 2004

(51) Int. Cl.$^7$ ................................................ H05K 7/20
(52) U.S. Cl. .................................................... 361/695
(58) Field of Search ....................... 165/80.3, 121–122; 62/259.2; 361/687–695, 756, 757, 801–802; 454/184

(56) References Cited

U.S. PATENT DOCUMENTS

| | | | | |
|---|---|---|---|---|
| 4,399,485 A | * | 8/1983 | Wright et al. | 361/695 |
| 4,894,749 A | | 1/1990 | Elko et al. | |
| 4,935,845 A | | 6/1990 | Schwehr et al. | |
| 5,136,465 A | * | 8/1992 | Benck et al. | 361/695 |
| 5,196,989 A | * | 3/1993 | Zsolnay | 361/690 |
| 5,375,038 A | | 12/1994 | Hardt | |
| 5,410,448 A | * | 4/1995 | Barker, III et al. | 361/695 |
| 5,432,674 A | | 7/1995 | Hardt | |
| 5,680,294 A | * | 10/1997 | Stora et al. | 361/695 |
| 5,751,550 A | | 5/1998 | Korinsky | |
| 5,774,330 A | | 6/1998 | Melton et al. | |
| 5,813,243 A | | 9/1998 | Johnson et al. | |
| 5,860,291 A | | 1/1999 | Johnson et al. | |
| 6,018,458 A | * | 1/2000 | Delia et al. | 361/690 |
| 6,483,700 B1 | * | 11/2002 | Malone et al. | 361/690 |
| 6,512,672 B1 | * | 1/2003 | Chen | 361/695 |

FOREIGN PATENT DOCUMENTS

GB 2 378 823 A 2/2003

OTHER PUBLICATIONS

A copy of GB Search Report for Application No. GB 0320443.5 mailed on Nov. 3, 2003 (1 page).

* cited by examiner

Primary Examiner—Gregory D. Thompson

(57) ABSTRACT

The present invention provides a baffle for use with an electronic system including a wall, a first edge guide, and a second edge guide. The wall has a first edge and a second edge opposite the first. The first edge guide is connected to the wall and extends beyond the first edge of the wall. The second edge guide is connected to the wall and extends beyond the second edge of the wall. The first edge guide and the second edge guide are adapted to selectively associate with a first card guide and a second card guide of the modular electronic system. The baffle is adapted to manage airflow within the modular electronic system.

25 Claims, 5 Drawing Sheets

COMPOSITE CONSTRUCTION BAFFLE FOR MODULAR ELECTRONIC SYSTEMS

FIELD OF THE INVENTION

The present invention generally relates to an airflow management system for a modular electronic system, and more particularly to a composite construction baffle for managing airflow within the modular electronic system.

BACKGROUND OF THE INVENTION

Conventional centralized modular electronic systems provide a centralized storage place for information, computing and/or electronic resources, software, computing power, and/or other resources which may be accessed by a number of users. Modular electronic systems are typically employed in servers, phone systems, or other centralized electronic systems in a multi-user network. The modular configuration of conventional centralized electronic systems typically includes a housing with multiple card guides or slots for selectively receiving various numbers of processors, memories, and/or other electronic components. The modular configuration is easily serviced and expanded. As such, a conventional modular electronic system may initially include multiple card guides or slots that do not contain a processor, memory, or other electronic components, and instead are initially empty to allow for subsequent system expansion.

During operation of a modular electronic system, the components comprising processors, memory and/or other modular electronic components generate heat. If the electronic components are allowed to overheat within the housing, the potential for damage or lessened useful service life of the electronic system increases. As such, modular electronic systems typically include a forced air cooling system. A conventional forced air cooling system includes a fan and a housing having one or more inlet apertures and one or more outlet apertures. The fan effectuates air movement through the inlet aperture, throughout the housing, and out the outlet apertures. The air flows around and between the electronic components to cool the electronic components.

The initially empty card guides create large open areas within the electronic system housing and, thereby, create an alternate and less resistant route for air to flow through the housing, as compared to a route through the housing area populated with electronic components. As a result, a majority of the airflow passes through the open area and less air passes around and between the heat generating components, thereby, decreasing the efficiency of the cooling system. A typical response to the decreased cooling efficiency is to insert a baffle configured to direct air away from the open area within the housing and towards the heat generating components in the populated area. The baffle effectively blocks off the open area from airflow and, consequently, promotes airflow around and between the heat generating components.

By directing airflow toward populated areas, baffles increase the efficiency of the airflow and, therefore, decrease the need for additional fans, which would increase the overall cost and complexity of the modular electronic unit. By avoiding the employment of additional fans, the baffles decrease the space needed in the housing as well as the noise caused by air and fan movement.

In addition to being capable of deflecting air and directing it toward populated areas of a modular electronic system, baffles preferably have low flammability, and are not ESD (electrostatic discharge) generators. Electronic systems may be ignited by internal and/or external sources. As a result, low flammability baffles, and other electronic components, decrease potential fire damage to the electronic system. Exposure to large amounts of ESD is a well-known cause of failure for electronic circuits. ESD built up during manufacturing and servicing of circuits can be quickly discharged when the charged item comes in contact with a circuit. The discharge is especially effectuated when the circuit is connected to a power supply. The discharge of electrostatic energy can cause a short circuit within the electric component, which remains after the ESD is completed, and can thereby render the circuit, and therefore at least a portion of the electronic system, useless. As a result, low flammability, non-ESD generating baffles are preferred.

Conventional baffles have typically been entirely made of either thermo-molded plastic or sheet metal. It is difficult to find a suitable plastic for a thermo-molded baffle, as low flammability and low-ESD generation properties tend to be mutually exclusive in most plastics. In response to the difficulty in finding a suitable plastic, low flammability plastics may be used and coated with an anti-static coating to alleviate the ESD problem. However, anti-static coating is expensive and degrades over time. Due to the time degradation, injection molded plastic baffles need to be periodically replaced within the modular electronic system to prevent problems with ESD generation.

Baffles made entirely of sheet metal typically meet the low flammability and non-ESD generation requirements. However, the card guides or receiving slots of the modular electronic system housing are commonly made of sheet or cast metal. Interaction between the sheet metal baffle and the metal card guides induces friction between the two metal members and commonly creates metal shavings. The metal shavings are contaminates which may destroy or alter the functions of the electronic components.

For at least the reasons stated above, an air management system including a baffle having low flammability, low-ESD generation, and decreased generation of contaminants is desired for use in modular electronic systems.

SUMMARY OF THE INVENTION

The present invention provides a baffle for an electronic system including a wall, a first edge guide, and a second edge guide. The wall has a first edge and a second edge opposite the first. The first edge guide is connected to the wall and extends beyond the first edge of the wall. The second edge guide is connected to the wall and extends beyond the second edge of the wall. The first edge guide and the second edge are adapted to selectively associate with a first card guide and a second card guide of the modular electronic system. The baffle is adapted to manage airflow within the modular electronic system.

Another aspect of the present invention provides a modular electronic system including a housing, a heat-generating cell board, and a baffle. The housing includes a first card guide and a second card guide opposite the first card guide. The heat-generating cell board extends between and is selectively maintained by the first card guide and the second card guide. The baffle is spaced from the cell board and is adapted to direct airflow towards the cell board. The baffle includes a wall having a first edge and a second edge opposite the first edge, a first edge guide connected to the wall and extending from the wall beyond the first edge, and a second edge guide connected to the wall and extending from the wall beyond the second edge. The first edge guide and the second edge guide are selectively received by the first card guide and the second card guide, respectfully.

Another aspect of the present invention includes a method of cooling a modular electronic system including a housing having a first card guide and a second card guide opposite the first card guide, and a heat generating cell board extending between and selectively maintained by the first card guide and the second card guide. The method includes installing a baffle in the housing, and routing air through the housing including utilizing the baffle to direct air over the heat generating cell board to cool the heat generating cell board. The baffle includes a wall having a first edge and a second edge opposite the first edge, a first edge guide connected the wall and extending from the wall beyond the first edge, and a second edge guide connected to the wall and extending from the wall beyond the second edge. The first edge guide and the second edge guide being selectively received by the first card guide and the second card guide, respectfully.

Another aspect of the present invention includes a method of cooling a modular electronic system that includes a housing having a first card guide and a second card guide opposite the first card guide, and a heat generating cell board extending between and selectively maintained by the first card guide and the second card guide. The method of cooling including routing air through the housing including utilizing a baffle to direct air over the heat generating cell board. The baffle includes a wall having a first edge and a second edge opposite the first edge, a first edge guide connected to the wall and extending beyond the first edge, and a second edge guide connected to the wall and extending beyond the second edge. The first edge guide and the second edge guide are selectively received by the first card guide and the second card guide, respectively.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
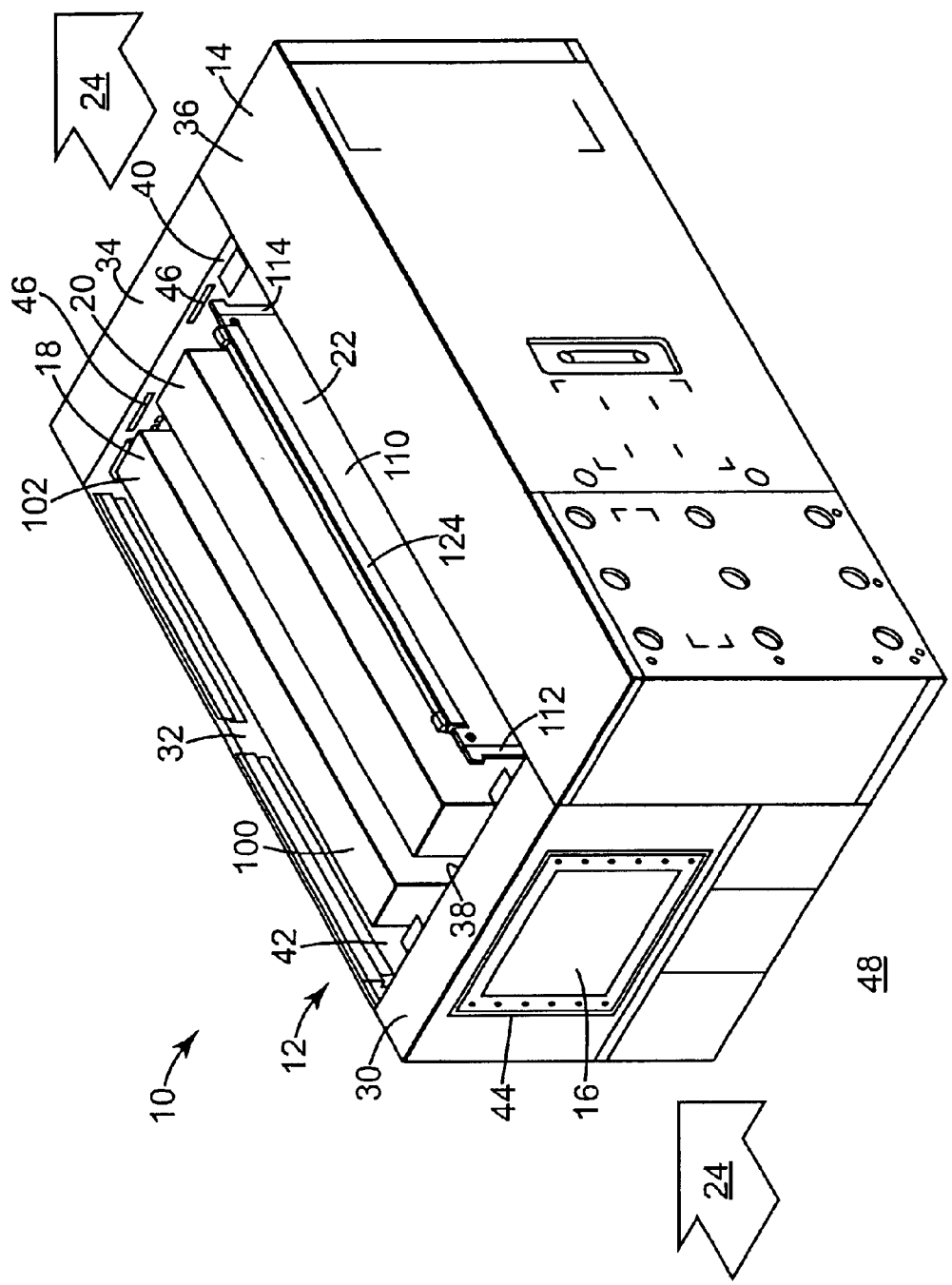
FIG. 1 is a perspective view illustration of one embodiment of an electronic system according to the present invention.

One example of a portion of a modular electronic system according to the present invention is generally illustrated at 10 in FIG. 1. In this embodiment, electronic system 10 includes a server system 12. Server system 12 includes a housing 14, a fan 16, a memory cell board 18, a processor cell board 20, and a composite construction baffle 22. Housing 14 selectively receives processor cell board 16 and memory cell board 18. Fan 20 is mounted to housing 14 to induce airflow into housing 14 and past and between memory cell board 18 and processor cell board 20. Composite construction baffle 22 is selectively received by housing 14 and is adapted to direct airflow, as indicated by airflow arrows 24, towards the populated areas of housing 14 for efficient cooling of cell boards 18 and 20.

Housing 14 includes a plurality of walls 30, 32, 34, and 36, a front card guide 38, and a rear card guide 40. Walls 30, 32, 34, and 36 are positioned end to end, and each wall is orientated substantially perpendicular to each adjacent wall so as to define a cavity 42. Notably, directional terminology such as "front," "rear," "bottom," and "top" is used for purposes of illustration and with reference to the orientation of the Figures. However, electronic system 10 and the components included therein can be positioned in other orientations such that the directional terminology is in no way limiting.

In one embodiment, wall 30 includes one or more inlet openings 44 adapted to allow air to travel through wall 30 and into cavity 42. In one embodiment, one or more of inlet openings 44 is sized and shaped to receive and maintain fan 16. Fan 16 is adapted and orientated within inlet opening 44 to induce movement of air from an external area 48 with respect to cavity 42, into and through cavity 42.

Wall 34 is opposite wall 30 and includes one or more outlet openings 46. Outlet openings 46 are adapted to allow the airflow induced by fan 16 to exit cavity 42 and, therefore, housing 14. In an alternative embodiment, fan 16 may be located in one of outlet openings 46 and be oriented to pull air through cavity 42, rather than to push air through cavity 42. In another embodiment, fan 16 is positioned in inlet opening 44 and another fan (not shown) is positioned in outlet opening 46. As such, both fans are orientated to effectuate airflow 24, described above.

Figure 2:
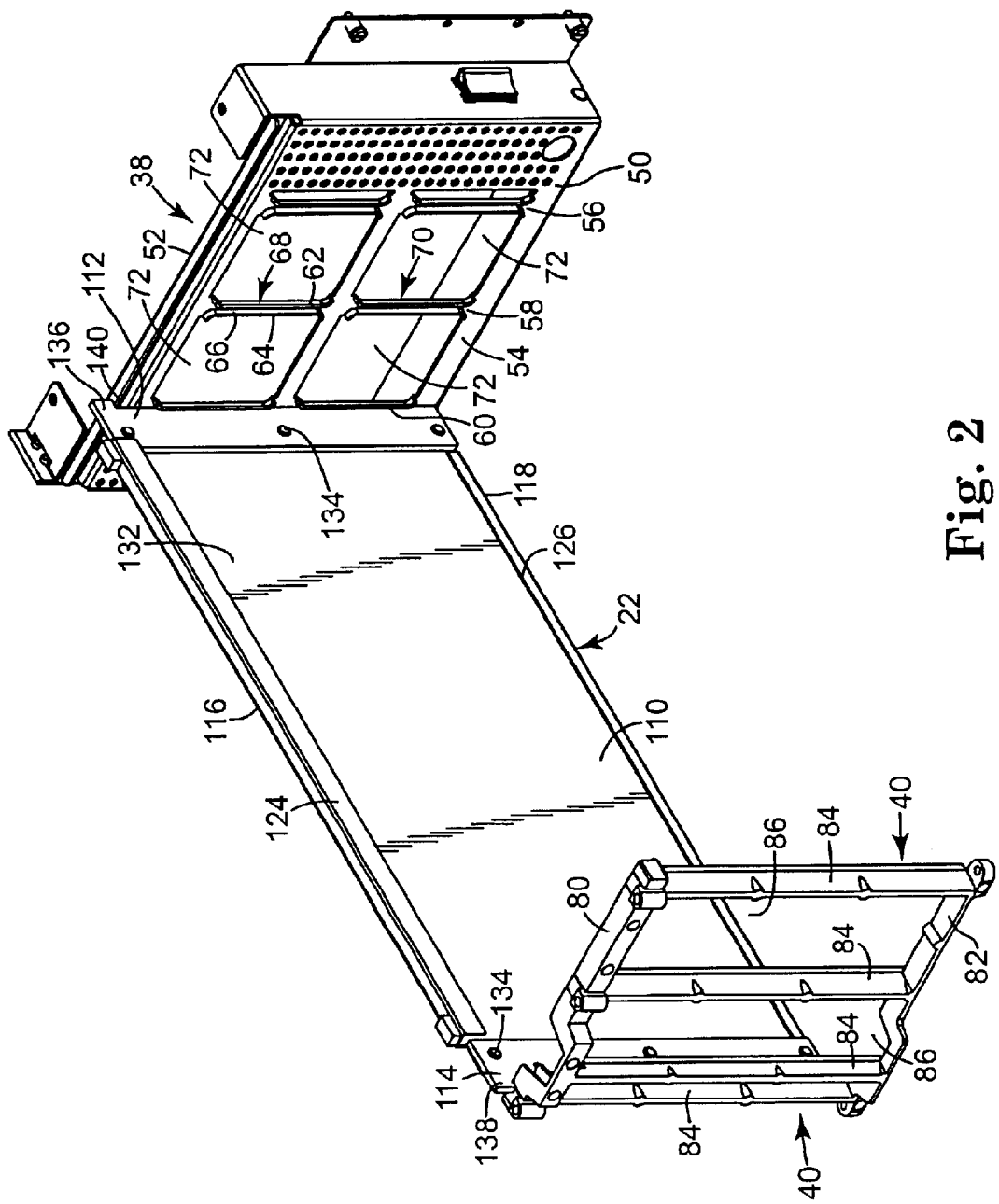
FIG. 2 is a perspective view illustration of a portion of one embodiment of the electronic system of FIG. 1.
Figure 3:
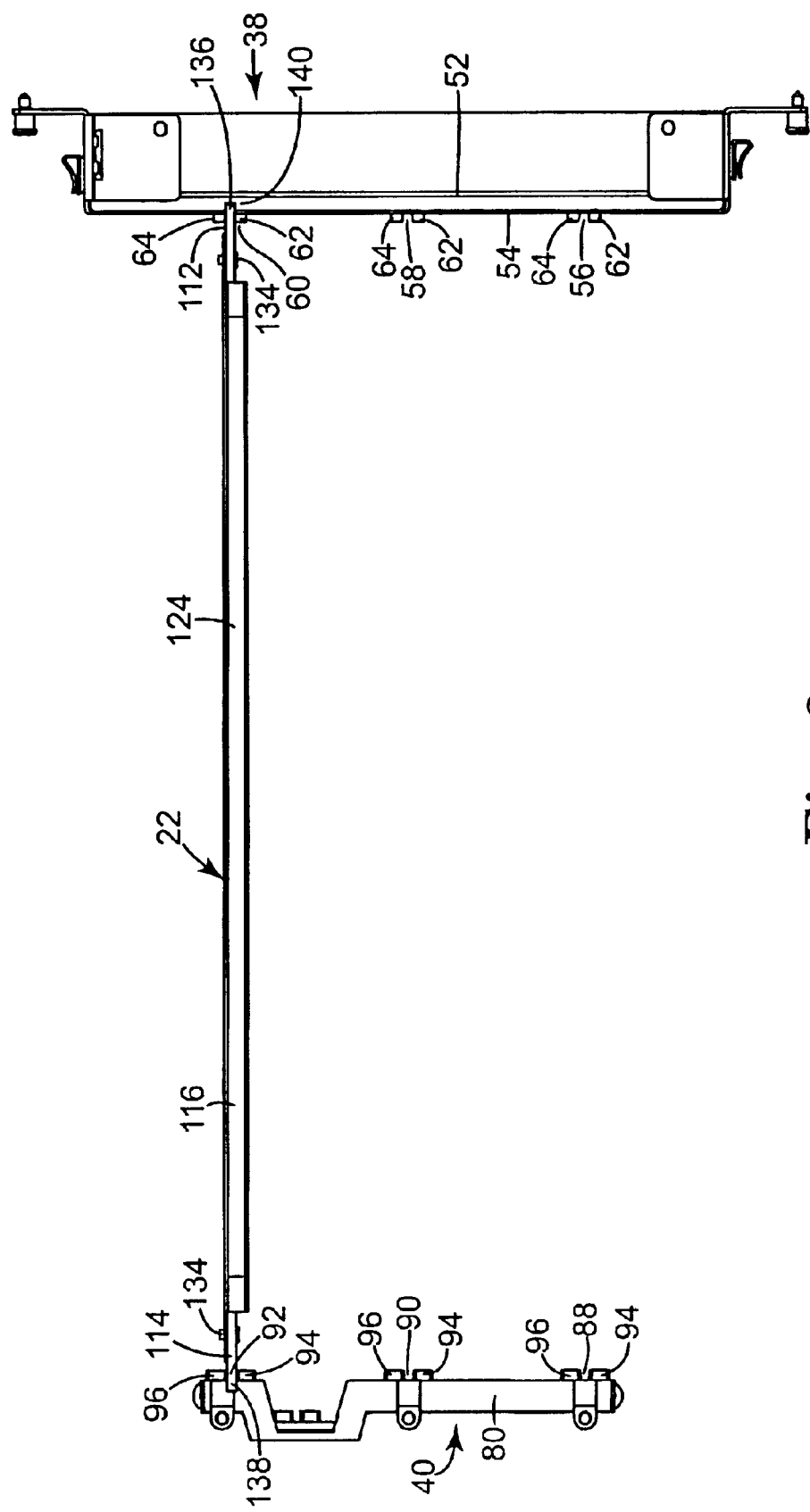
FIG. 3 is a top-view illustration of the portion of the electronic system illustrated in FIG. 2.

In one embodiment, card guide 38 is connected to wall 30. In one embodiment, card guide 38 has a width substantially equal to the width of wall 30. In one embodiment, as best illustrated in FIGS. 2 and 3, card guide 38 defines an inner wall section 50 positioned parallel with wall 30. Section 50 has a first side 52 positioned toward wall 30 and a second side 54 positioned away from wall 30 and, therefore, toward cavity 42. Second side 54 defines a plurality of slots. In one embodiment, as illustrated in FIG. 3, second side 54 includes three slots 56, 58, and 60. Each slot 56, 58, or 60 is adapted to receive a modular component of electronic system 10, such as processor cell board 20, memory cell board 18, or composite construction baffle 22, as will be further described below.

As such, each slot 56, 58, or 60 includes a lip 62 and a lip 64. Lips 62 and 64 extend from second side 54 toward cavity 42. Lip 62 and 64 each extends out a sufficient distance from second side 54 to produce a contact area 66 adapted to interact with the modular component. Lips 62 and 64 are orientated parallel with one another such that contact area 66 of lip 62 faces contact area 66 of lip 64. As such, lip 62 is spaced from lip 64 to allow the modular component or part of the modular component to slidably and securely fit between the lips 62 and 64, preferably contacting contact area 66 of each lip 62 and 64. In one embodiment, each slot 56, 58, and 60 is formed of a top segment 68 and a similar bottom segment 70, and each segment 68 and 70 includes lips 62 and 64.

Slots 56, 58, and 60 are laterally spaced from one another along side 52 of section 50 as dictated by the size of the modular components to be contained thereby. More particularly, slots 56, 58, and 60 are spaced such that the modular components to be contained within the housing do not physically interact or interfere with each other. One or more inlet vents 72 are defined by section 50 between slots 56 and 58 and between slots 58 and 60. Inlet vents 72 are adapted to allow airflow 24 (shown in FIG. 1) to pass through inner wall section 50 and into cavity 42. In one embodiment, front card guide 38 is formed of a nonflammable and non-ESD generating material. In one embodiment, front card guide 38 is formed of a stamped, steel, sheet metal material. However, other sheet metals and similar materials are equally acceptable.

In one embodiment, rear card guide 40 is attached to wall 34 toward cavity 42. Rear card guide 40 includes an upper support 80, a lower support 82, and one or more vertical braces 84. Upper support 80 and lower support 82 are vertically spaced from one another in both run in an overall direction substantially parallel to wall 34. The one or more braces 84 are laterally spaced from one another and extend vertically between and connect to each of upper support 80 and lower support 82. In one embodiment, three or more braces 84 extend between and are connected to each of upper support 80 and lower support 82. Notably, use of supports 80 and 82 and braces 84, rather than an inner wall section 50 as in front card guide 38, inherently leaves openings between the braces which function as air vents 86 to allow airflow 24 to pass through rear card guide 40 to exit cavity 42.

In one embodiment, illustrated in detail in FIG. 3, three of the braces 84 each include one of a slot 88, 90, or 92, similar to slots 56, 58, and 60 of front card guide 38. Each slot 88, 90, and 92 includes a lip 94 and a lip 96. Each lip 94 and 96 extends from the respective brace 84 in towards cavity 42. Lips 94 and 96 each extends from brace 84 out a sufficient distance to produce a contact area 98 adapted to interact with the modular component. Lip 94 and lip 96 are orientated parallel with one another such that contact area 66 of lip 62 faces contact area 66 of lip 64. Further, lip 94 is laterally spaced from lip 96 to allow the modular component or part of the modular component to slidably and securely fit between the lips 94 and 96, preferably contacting contact area 98 of each lip 94 and 96.

Braces 84, and therefore slots 88, 90, and 92, are laterally spaced from one another along upper support 80 and lower support 82 as dictated by the size of the modular component to be contained thereby. In particular, slots 88, 90, and 92 have similar lateral positions within housing 14 as slots 56, 58, and 60, respectfully, such that a single modular component can interact with one of slots 88, 90, and 92 on one end and one of slots 56, 58, and 60, respectively, on the other end Furthermore, the lateral spacing of slots 88, 90, and 92 prevent the modular components from physically interacting with each other. In one embodiment, rear card guide 40 is formed from a cast aluminum. However, other similar materials are equally acceptable.

In one embodiment, such as illustrated in FIGS. 1, 2, and 3 collectively, memory cell board 18 is slidably received by slot 56 and slot 88. In particular, memory cell board 18 has a first end 100 and a second end 102. First end 90 is adapted to fit between lip 62 and lip 64 of slot 56, and second end 90 is adapted to fit between lip 94 and 96 of slot 88. As such, memory cell board 18 is selectively maintained by front card guide 38 and rear card guide 40. In one embodiment, processor cell board 20 is slidably received by slot 58 and 90 in a similar manner as described above with respect to memory cell board 18 and slots 56 and 88 such that memory cell board 18 and processor cell board 20 have a substantially parallel orientation. Notably, although memory cell board 18 and processor cell board 20 are illustrated as blocks, memory cell board 18 and processor cell board 20 include numerous circuits, and cells that are irregular protrusions extending from a circuit board. The circuits and cells are heat producing elements that require forced air circulation to fill the voids surrounding each circuit or cell rather than just passing over the largest protrusions as deflected air flow.

Figure 4:
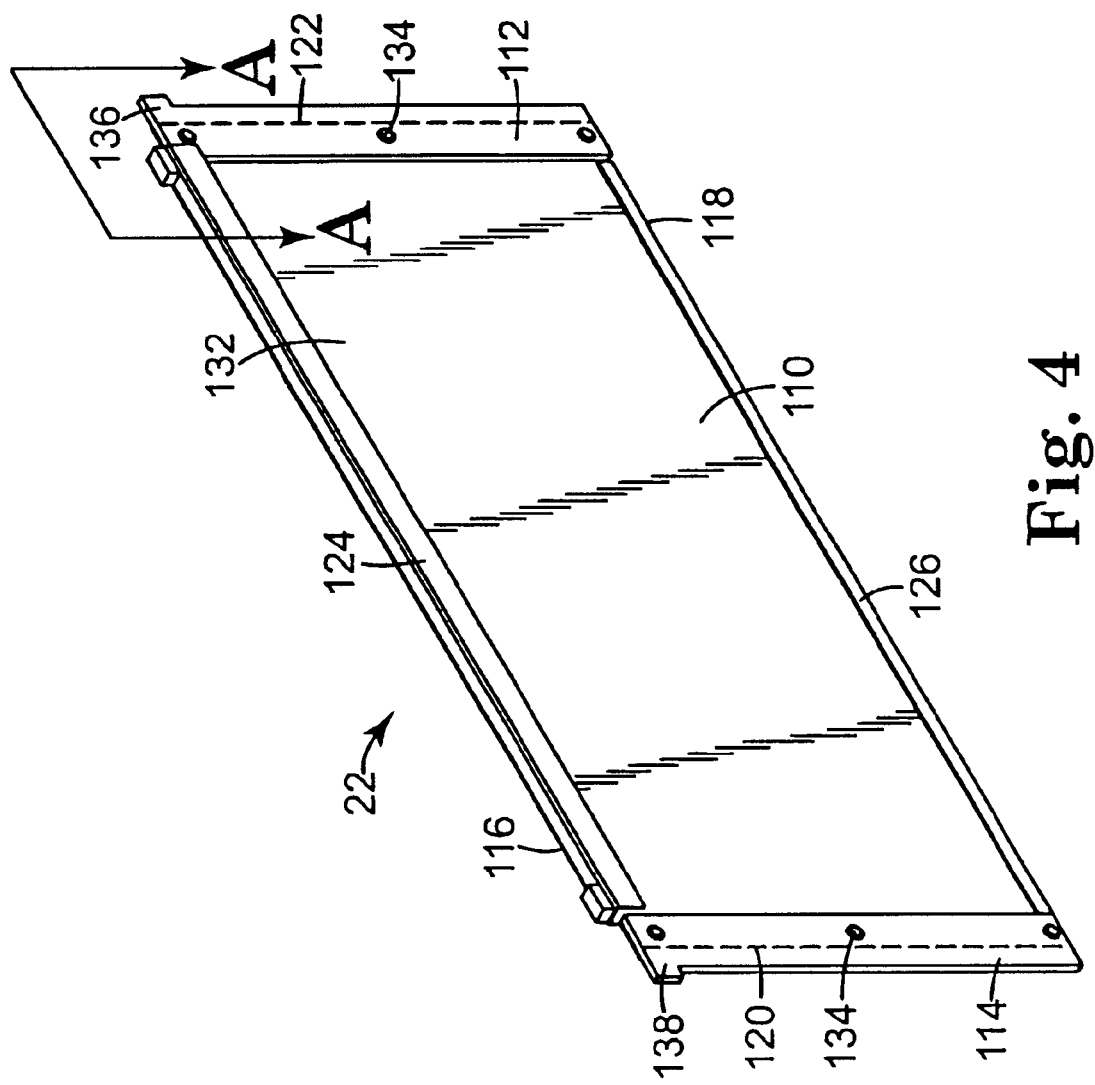
FIG. 4 is a perspective view illustration of one embodiment of a composite construction baffle according to the present invention.

Similarly, composite construction baffle 22 is slidably received by slots 60 and 92 and has a substantially parallel orientation with memory cell board 18 and processor cell board 20. As illustrated in FIG. 4, one embodiment of composite construction baffle 22 includes a substantially planar wall 110, a front edge guide 112, and a back edge guide 114. Planar wall 110 is sized and shaped to deflect airflow 24 toward the populated areas of cavity 42 and away from empty areas or voids in cavity 42. In one embodiment, planar wall 110 is rectangular in shape and defines a top edge 116, a bottom edge 118, a front edge 120, and a rear edge 122, with respect to the orientation of FIG. 4.

In one embodiment, top edge 116 and bottom edge 120 are formed into a box section or hem 124 and 126, respectively, to increase the strength and rigidity of planar wall 110. Box sections or hems 124 and 126 are generally U-shaped and add sufficient rigidity to allow planar wall 110 to be formed from a relatively thin material. In one embodiment, planar wall 110 is formed from a non-flammable, non-ESD generating material. In one embodiment, planar wall 110, including box sections 124 and 126, is formed from a sheet metal material.

Figure 4A:
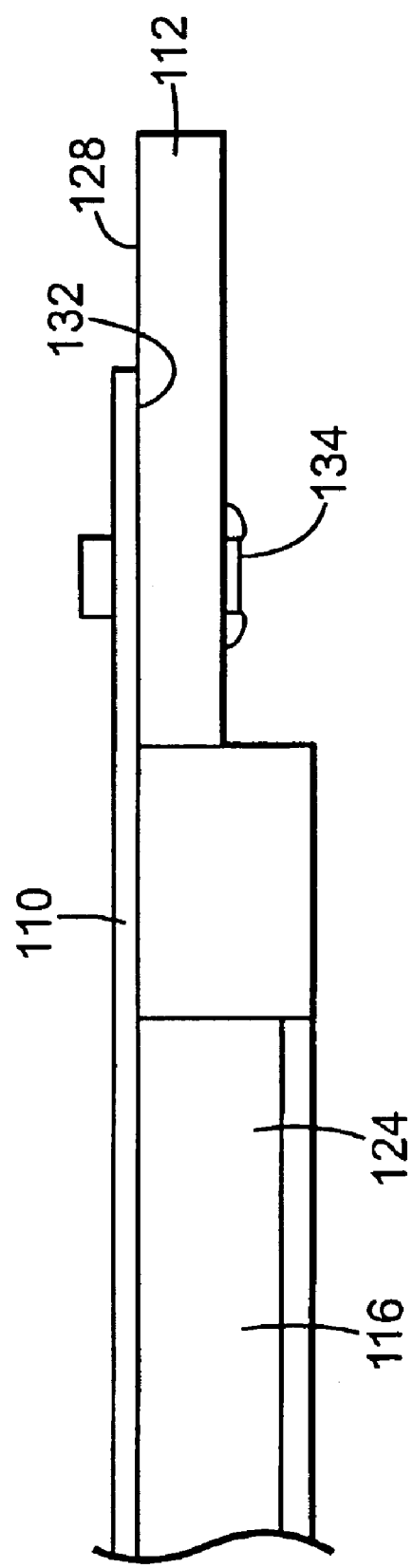
FIG. 4A is a magnified top-view illustration of a portion of FIG. 4 at line A—A.

Front edge 120 and rear edge 122 are protected from damaging interaction with the metal card guides 38 and 40 by front edge guide 112 and rear edge guide 114, respectively. Each edge guide 112 and 114 is sized to slide within one of slots 56, 58, 60, 88, 90, or 92 and is secured to planar wall 110. As best illustrated in FIGS. 4 and 4A, each edge guide 112 and 114 has a surface 128 and 130, respectively, that interfaces with a surface 132 of planar wall 110 and is substantially the same length as front edge 120 and rear edge 122, respectfully. Each edge guide 112 and 114 is secured to planar wall 110 by a plurality of connection pieces 134, such as rivets, bolts, etc. Moreover, edge guide 112 and 114 each extends from the planar wall 110 beyond the respective front edge 120 or back edge 122 to form an interface area to interact with card guides 38 and 40. In one embodiment, the top of each edge guide 112 and 114 further includes a tab or hanger 136 or 138, respectively, adapted to rest upon a top edge 140 of first card guide 38 or upper support 80, respectively. Hangers 136 and 138 further ensure proper positioning of composite construction baffle 22 within cavity 42.

In one embodiment, edge guides 112 and 114 are of a sufficiently small size to decrease ESD concern, such that an ESD generating material may be used to form edge guides 112 and 114. Accordingly, the amount of ESD generating material is sufficiently small that it need not be given an anti-static coating. In one embodiment, edge guides 112 and 114 are formed from a non-flammable material. Edge guides 112 and 114 may be formed from a polymeric material or more particularly a plastic, such as polypropylene. In one embodiment, plastics used to form edge guides 112 and 114 have been assigned a V-0 rating in the UL-94 flammability test. In other words after initial ignition, the plastic tested self-extinguishes immediately after removal of an ignition source. In addition, the edge guides 112 and 114 are formed of a material which retains its integrity during interaction with card guides 38 and 40. As such, the edge guide material does not produce shavings or other contaminants upon interaction with card guides 38 and 40.

During use of electronic system 10, fan 16 is activated to introduce airflow through cavity 42 as illustrated in FIG. 1. In particular, fan 16 directs air from external area 48 through housing inlet opening(s) 44, through inlet vents 72, and into cavity 42. Air is pushed or pulled by fan 16 through cavity 42 in and between circuits and components of memory cell board 18 and processor cell board 20. Any airflow 24 directed toward composite construction baffle 22 is deflected off of composite construction baffle 22, namely off of wall 110, back towards memory cell board 18 and processor cell board 20. Deflecting airflow 24 off of baffle 22 decreases the amount of airflow in open areas of cavity 42 and increases the amount of airflow 24 around and between memory cell board 18 and processor cell board 20. Increasing airflow 24 around and between the populated areas of cavity 42, consequently, increases airflow 24 around and between the heat generating components (circuits of cells) contained on cell boards 18 and 20. Increased airflow around and between the heat generating components leads to more efficient cooling of the heat generating components and, as a result, a longer service life of electronic system 10.

Notably, composite construction baffle 22 is slidably and selectively received by card guides 38 and 40 so composite construction baffle 22 may be removed and replaced with an additional cell board (not shown) for subsequent expansion of the capabilities of electronic system 10. Additionally, although illustrated with three slots in each card guide, electronic system 10 can include additional slots which may be filled by additional cell boards or additional composite construction baffles as desired. For example, modular electronic system 10 may include space for up to 20 different cell boards. Furthermore, front card guide 38 may be formed in a similar manner as described with respect to rear card guide 40. Similarly, rear card guide 40 may be formed in a similar manner as described with respect to front card guide 38.

A modular electronic system in accordance with the present invention includes a composite construction baffle designed to manage and/or direct airflow towards the populated areas of a cavity including heat generating components to more efficiently cool the elements, thereby increasing the server life of the heat generating components and the cell boards they comprise. Furthermore, the composite construction of the baffle prevents production of contaminates during interaction between the cell board and the card guides and decreases ESD concern. In addition, a composite construction baffle prevents creation of contaminants without requiring additional components to be installed into the electronic system housing. By preventing production of contaminates and ESD the server life of the cell boards and other electronic components is extended.

Although specific embodiments have been illustrated and described herein for purposes of description of the preferred embodiments, it will be appreciated by those of ordinary skill in the art that a wide variety of alternate and/or equivalent implementations calculated to achieve the same purposes may be substituted for the specific embodiments shown and described without departing form the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A baffle for a modular electronic system, the baffle comprising:
   a wall having a first edge and a second edge opposite the first edge;
   a first edge guide connected to the wall and extending beyond the first edge; and
   a second edge guide connected to the wall and extending beyond the second edge;
   wherein the first edge guide and the second edge guide are adapted to selectively associate with a first card guide and a second card guide of the modular electronic system, and the baffle is adapted to manage airflow within the modular electronic system.

2. The baffle of claim 1, wherein the first edge guide is sized to prevent the first edge from contacting the first card guide, and the second edge guide is sized to prevent the second edge from contacting the second card guide.

3. The baffle of claim 1, wherein the first edge guide and the second edge guide are adapted to maintain their integrity during association with the first card guide and the second card guide.

4. The baffle of claim 1, wherein the wall is formed from a non-ESD generating material.

5. The baffle of claim 4, wherein the wall is formed from a non-flammable material.

6. The baffle of claim 5, wherein the non-ESD generating material is a sheet metal.

7. The baffle of claim 1, wherein the first edge guide and the second edge guide are formed of a polymeric material.

8. The baffle of claim 7, wherein the polymeric material is a plastic material.

9. The baffle of claim 8, wherein the polymeric material is a polypropylene material.

10. The baffle of claim 7, wherein the polymeric material is substantially non-flammable.

11. The baffle of claim 10, wherein the polymeric material has a UL-94 rating of V-0.

12. A modular electronic system comprising:
    a housing including a first card guide and a second card guide opposite the first card guide;
    a heat generating cell board extending between and selectively maintained by the first card guide and the second card guide;
    a baffle spaced from the cell board and adapted to direct airflow towards the cell board, the baffle including:
      a wall having a first edge and a second edge opposite the first edge;
      a first edge guide connected to the wall and extending beyond the first edge, the first edge guide being selectively received by the first card guide, and
      a second edge guide connected to the wall and extending beyond the second edge, the second edge guide being selectively received by the second card guide.

13. The modular electronic system of claim 12, wherein the first edge guide is sized to prevent the first edge from contacting the first card guide, and the second edge guide is sized to prevent the second edge from contacting the second card guide.

14. The modular electronic system of claim 12, wherein the first edge guide and the second edge guide are adapted to maintain their integrity while received by the first card guide and the second card guide.

15. The modular electronic system of claim 14, wherein the first edge guide and the second edge guide are substantially non-flammable.

16. The modular electronic system of claim 14, wherein the first edge guide and the second edge guide are formed from a polymeric material.

17. The modular electronic system of claim 12, further comprising:
- a fan mounted to the housing with an orientation substantially perpendicular to the baffle and the heat generating cell board, the fan adapted to introduce airflow into the housing to cool the heat generating cell board.

18. The modular electronic system of claim 12, wherein the wall is formed from a non-flammable and a non-ESD generating material.

19. A method of cooling a modular electronic system including a housing having a first card guide and a second card guide opposite the first card guide; and a heat generating cell board extending between and selectively maintained by the first card guide and the second card guide, the method comprising:
- installing a baffle in the housing, the baffle including:
  - a wall having a first edge and a second edge opposite the first edge,
  - a first edge guide connected to the wall and extending beyond the first edge, the first edge guide being selectively received by the first card guide, and
  - a second edge guide connected to the wall and extending beyond the second edge, the second edge guide being selectively received by the second card guide; and
- routing air through the housing including utilizing the baffle to direct air over the heat generating cell board to cool the heat generating cell board.

20. The method of claim 19, wherein installing a baffle includes positioning the baffle to increase airflow over the heat generating cell board.

21. The method of claim 19, wherein installing a baffle includes preventing the first edge from contacting the first card guide and preventing the second edge from contacting the second card guide.

22. The method of claim 19, wherein the wall is formed from a non-flammable and non-ESD generating material.

23. The method of claim 19, wherein the first edge guide and the second edge guide maintain their integrity when received by the first card guide and the second card guide.

24. The method of claim 19, wherein routing air through the housing includes one of pulling or pushing air into the housing by a fan mounted to the housing.

25. A method of cooling a modular electronic system including a housing having a first card guide and a second card guide opposite the first card guide; and a heat generating cell board extending between and selectively maintained by the first card guide and the second card guide, the method comprising:
- routing air through the housing including utilizing a baffle to direct air over the heat generating cell board to cool the heat generating cell board, the baffle including:
  - a wall having a first edge and a second edge opposite the first edge,
  - a first edge guide connected to the wall and extending beyond the first edge, the first edge guide being selectively received by the first card guide, and
  - a second edge guide connected to the wall and extending beyond the second edge, the second edge guide being selectively received by the second card guide.

* * * * *